United States Patent [19]

Gellert

[11] Patent Number: 5,135,377
[45] Date of Patent: Aug. 4, 1992

[54] INJECTION MOLDING NOZZLE FOR AN INJECTION MOLDING SYSTEM

[76] Inventor: Jobst U. Gellert, 7A Prince Street, Georgetown, Ontario, Canada, L7G 2X1

[21] Appl. No.: 711,300

[22] Filed: Jun. 6, 1991

[30] Foreign Application Priority Data

Oct. 12, 1990 [DE] Fed. Rep. of Germany ....... 4032509

[51] Int. Cl.⁵ .................................................. B29C 45/23
[52] U.S. Cl. ................................ 425/130; 264/328.15; 425/549; 425/564; 425/573
[58] Field of Search ............... 425/130, 562, 563, 564, 425/565, 566, 549, 568, 570, 572, 573; 264/328.8, 328.15

[56] References Cited

U.S. PATENT DOCUMENTS

| | | | |
|---|---|---|---|
| 3,947,177 | 3/1975 | Eckardt | 425/130 |
| 4,443,177 | 4/1984 | Modur et al. | 425/549 |
| 4,470,936 | 9/1984 | Potter | 264/39 |
| 4,557,685 | 12/1985 | Gellert | 425/549 |
| 4,576,567 | 3/1986 | Gellert | 425/568 |
| 4,652,230 | 3/1987 | Osuna-Diaz | 425/570 |
| 4,657,496 | 4/1987 | Ozeki et al. | 425/130 |
| 4,702,686 | 10/1987 | Gauler | 425/573 |
| 4,808,101 | 2/1989 | Schad et al. | 425/130 |
| 4,875,848 | 10/1989 | Gellert | 425/549 |
| 4,941,249 | 7/1990 | Gellert | 425/572 |
| 4,954,072 | 9/1990 | Zimmerman | 425/549 |
| 5,055,028 | 10/1991 | Trakas | 425/549 |

FOREIGN PATENT DOCUMENTS

| | | |
|---|---|---|
| 339753 | 11/1989 | European Pat. Off. |
| 3632928 | 3/1988 | Fed. Rep. of Germany |
| 893933 | 11/1944 | France |
| 2620953 | 3/1989 | France |
| 8900655 | 3/1989 | Netherlands |

OTHER PUBLICATIONS

Modern Plastics, Feb. 1990 pp. 54–56.

Primary Examiner—Tim Heitbrink
Attorney, Agent, or Firm—Dalesman & Company

[57] ABSTRACT

A heated injection molding nozzle for use in an injection molding system for injection molding of several different plastic melts in one injection molding cycle. The nozzle has an elongated nozzle body with first and second longitudinal melt passages for two different plastic materials. The second melt passage is a melt bore which extends centrally through the nozzle body. The first melt passage has two outer melt bores which extend through the nozzle body on opposite sides of the second melt passage. The rear end face of the nozzle body has an off center melt inlet recess and two melt branch passages extending to the two outer melt bores.

10 Claims, 1 Drawing Sheet

INJECTION MOLDING NOZZLE FOR AN INJECTION MOLDING SYSTEM

BACKGROUND OF THE INVENTION

The present invention refers to an injection moulding nozzle for use in an injection moulding system, comprising a nozzle body which is provided with an essentially cylindrical outer surface and with a rear end face adapted to abut to a hot runner, further comprising at least a first and second melt passage for at least a first and second plastic melt wherein the second melt passage extends coaxially through the nozzle body and the first melt passage extends through said nozzle body at least substantially parallel to said second melt passage.

Today's injection moulding techniques make increasingly use of plastic materials which tend to show crystalline hardening structures and which, from the point of view of injection moulding technology, can only be processed with difficulties and within a narrow temperature range. It follows that a precise temperature control of the melt of plastic material along the melt passage in the injection moulding system from the melt inlet throughout the runner means and through the injection moulding nozzle up to the gate is particularly important with regard to the quality of the finished injection moulded part as well as with regard to the efficiency and the reliability of the mode of operation of the whole injection moulding system.

For a plurality of cases of use, e.g. in the field of packing industry for producing long-time packings for highly perishable foodstuff or for foodstuff which has to be used under difficult climatic conditions, it is desirable to process several plastic melts of different kinds simultaneously in one injection moulding cycle so as to obtain sandwichlike structures of materials, e.g. for providing plastic packings for foodstuff with an inner barrier layer consisting of an $O_2$-impervious plastic material, for embedding conductive plastic films between non-conductive plastic layers, etc. In the cae of the coinjection moulding of two plastic melts with different properties, which has to be carried out for this purpose, it is, however, difficult to master the injection moulding process from the point of view of tool technology in the case of multi-cavity hot runner systems. In particular, it is difficult to avoid, by making use of a suitable control regime, a mixing of the various plastic melts outside of the moulding cavity and to form defined core films within a basic layer of plastic material within extremely short cycle periods.

Hitherto known means for simultaneous injection moulding of different plastic melts include very often complicated injection moulding systems and associated control means, which, due to their degree of complexity, are susceptible to breakdown and expensive, and the results achieved with the aid of these means were not always satisfactory (cf. e.g. "Modern Plastics", February 1990, pages 54 to 56).

With respect to injection nozzles a plurality of different types thereof for feeding a plurality of plastic materials into a cavity are known, as for example described in EP-A 339 753, U.S. Pat. No. 4,808,101 or DE-A 36 32928. Moreover, similar injection nozzles enabling to supply of different kinds of plastic materials through separate melt channels to manufacture multilayered products are shown in EP-A 378 138, U.S. Pat. No. 4,470,936, DE-A 35 19 921 or U.S. Pat. No. 3,947,177, respectively.

A common feature of the majority of said known injection nozzles adapted to be used for coinjection moulding including sequential moulding comprises an internal structure of concentric shells or coaxial cylinders of different diameter in order to form separated flow channels for the different materials which normally should be fed to the cavity in an unmixed condition. Injection nozzles comprising a valve gated tip and a central melt bore feeding one of the melts whereas another melt flows through an annular melt towards the tip end of the nozzle are also known in the air (see for example DE-A 35 19 921). According to U.S. Pat. No. 4,470,936 two materials are fed through longitudinal separate melt channels forming melt supply bores which are disposed symmetrically with respect to a longitudinal centre axis of the nozzle.

SUMMARY OF THE INVENTION

It is an object of the present invention to provide an injection moulding nozzle for an injection moulding system adapted to manufacture multilayered products from at least two different plastic materials assuring a smooth and balanced flow of the different melts through the nozzle.

To this end, in one of its aspects, the invention provides an injection molding heated nozzle having an elongated body with a rear end face and a substantially cylindrical outer surface, the nozzle having first and second separate longitudinally extending melt passages, the second melt passage being a central melt bore extending coaxially through the nozzle body, the improvement wherein the first melt passage comprises first and second outer parallel melt bores extending through the nozzle body from the rear end face on opposite sides of the first melt passage, the rear end face of the nozzle body having an off center melt inlet recess and two melt branch passages, each branch passage extending from the inlet recess to one of the first and second outer melt bores.

Further objects and advantages of the invention will appear from the following description, taken together with the accompanying drawings.

DESCRIPTION OF THE PREFERRED EMBODIMENTS

Figure 2:
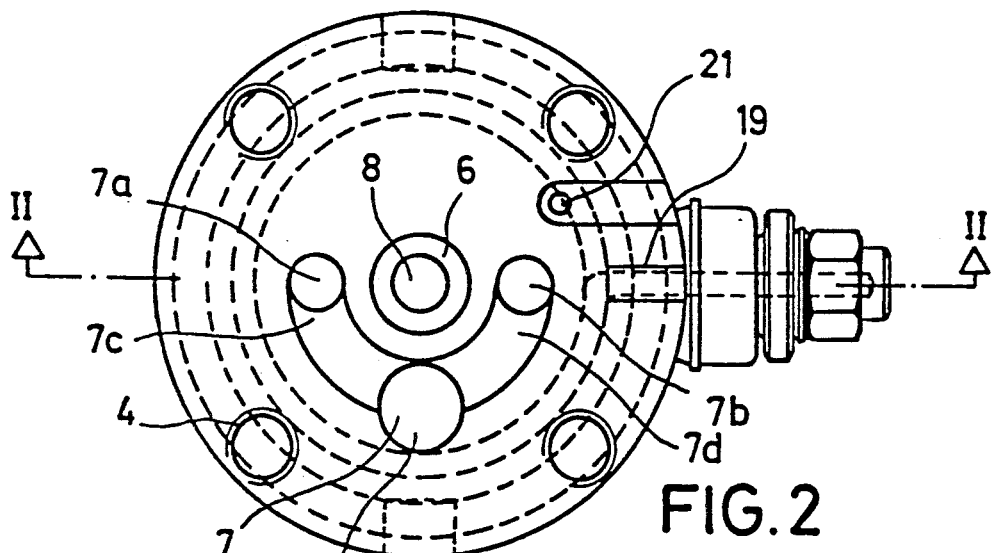
FIG. 2 shows a top view (rear view) of the injection moulding nozzle according to FIG. 1.
Figure 1:
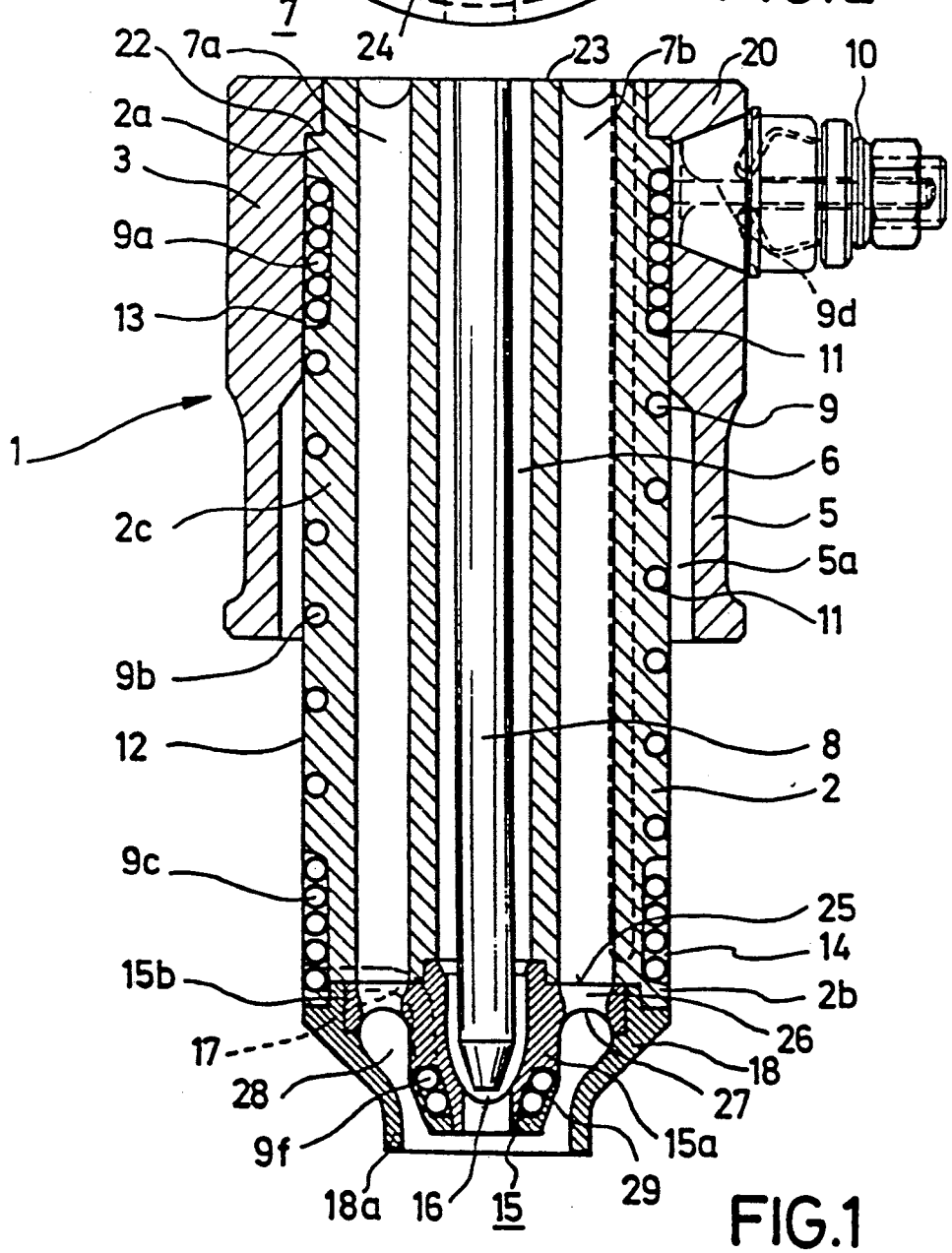
FIG. 1 shows a schematic representation of an injection moulding nozzle, which is used for coinjection moulding of two plastic melts, in a longitudinal section.

In the following, the present invention will be explained on the basis of an injection moulding nozzle, which is used for coinjection moulding of two melts of plastic material and which is schematically shown in FIG. 1 and 2.

An injection moulding nozzle of this type is provided, e.g. as part of a hot runner multi cavity injection moulding system, together with additional injection moulding nozzles, which have a corresponding structural design, for the purpose of producing packing receptacles for foodstuff in the case of which oxygen-tight sealing is required for long-time preservation, said oxygen-tight sealing being achieved by a barrier layer of plastic material, which is provided within the basic material of the packing receptacle consisting of an oxygen-permeable plastic material and which is connected to an oxygen-tight lid of said packing receptacle.

The embodiment shown in FIG. 1 and 2 comprises an injection moulding nozzle 1 used for needle valve gating and provided with a one-piece nozzle body 2 whose rear end section 2a has fixedly connected thereto a sleeve member 3, e.g. by means of laser welding, vacuum brazing or the like, said nozzle body 2 being provided with tapped holes 4 used for screw-fastening the injection moulding nozzle to a hot runner means, which is not shown in the present connection. The injection moulding nozzle 1 is received, in the conventional manner, in a moulding cavity and support plate, which is not shown in the present connection either, an insulating flange 5 of the sleeve member 3 defining an additional heat insulation means in connection with an air space 5a thus providing insulation against the cooled moulding cavity and support plate. A structural design, which is, from the point of view of production technology, particularly advantageous and simple with regard to the assembly of the sleeve member 3 and the nozzle body 2 is achieved on the basis of the feature that the rear end section 2a of the nozzle body 2 has provided thereon an annular shoulder 22 defining a stop means for the sleeve member 3, which is adapted to be attached to the nozzle body 2—especially such that a snug fit is obtained—and to be connected to said nozzle body 2 such that an integral unit is formed. For simultaneously providing two plastic melts in the area of the gate—not shown in the present connection—of an associated moulding cavity and for effecting a precise, timecontrolled, succesive injection of the plastic melts within one injection moulding cycle, the injection moulding nozzle 1 includes a central, second melt passage 6, which extends along the longitudinal axis of the injection moulding nozzle 1, and, radially displaced thereto, a first melt passage 7 for the first plastic material, said first melt passage 7 being constructed in the form of two melt bores 7a, 7b, which extend axially parallel with regard to the central, second melt passage 6.

Within the central, second melt passage 6, which defines a longitudinal bore of the nozzle body 2 through which the second plastic melt is supplied, a valve pin 8 is provided, which serves to effect valve pin gating and which can be controlled with regard to its longitudinal movability relative to the nozzle body 2 of the injection moulding nozzle 1 by means of a hydraulic actuating mechanism—which is not shown in the present connection—in the backplate of an injection moulding system; in FIG. 1, said valve pin is shown in a fully open condition with regard to the injection moulding nozzle and a gate of a moulding cavity—which is not shown in the present connection. On the other hand, control of the valve pin movement can be effected, at least partially, by the respective melt pressures of said first and second plastic materials themselves.

The present invention is, however, not limited to an injection moulding nozzle in the case of which valve pin gating is effected. On the contrary, it would be possible to dispense with a valve pin and to effect closure of a gate—which is not shown in the present connection—in a moulding cavity plate by freezing the second plastic melt in an opening 16 of the second melt passage 6 and below the nozzle tip, respectively, as well as to effect melt passage control for joint injection of several plastic melts in one injection moulding cycle for the purpose of forming a layer of barrier material in an injection moulded part on the basis of precise temperature control in the area of the nozzle tip by means of thermal valve gating.

For feeding and transporting the first plastic melt to the first and second melt bores 7a, 7b, a rear end face 23 has formed therein a semispherical inlet recess 24 from which branch passages 7c, 7d extend circumferentially in opposite directions, said branch passages 7c, 7d having the shape of arcuate sections of a semitoroidal cup and connecting the inlet recess 24 of the first melt passage 7 to the first and second melt bores 7a, 7b. The branch passages 7c, 7d and also the spherical cup of the inlet recess 24 each form semipassages and semirecesses, respectively, whose complementary cross-sections are formed such that they define a full cross-section in a hot runner means—which is not shown in the present connection—the injection moulding nozzle, when mounted on the hot runner means, being brought into correspondence with said full cross-section via the tapped holes 4. The first and second melt bores 7a, 7b are arranged such that they extend symmetrically with regard to the central melt bore and the central, second melt passage 6, respectively, parallel to and at equal distances from said melt passage 6 through the nozzle body 2 and such that they terminate at a front end face 25 at the front end section 2b of the nozzle body 2.

A nozzle tip, which defines in the central longitudinal axis of the injection moulding nozzle 1 a mouthpiece opening 16 of the inner, central, second melt passage 6, is obtained especially by means of a tip insert 15, which consists of a round body, said round body being, by means of an inner annular step arranged at the front end face 25 of the nozzle body 2 in a snug fit, if necessary, by applying circumferential tack welding. The tip insert 15, is provided with a cylindrical body 15a and with an annular flange 15b, which is formed integrally with said cylindrical body, said annular flange 15b being provided with connection holes 26, which form extensions of said first and second melt bores 7a, 7b and which open into an annular recess 27 on the downstream side so as to form an annular space 28, which surrounds the cylindrical body 15a and the opening 16 of the inner, second melt passage 6 and which is delimited outwards by a funnel member 18 completing the nozzle tip, said funnel member 18 being fixedly connected to the nozzle body 2, e.g. by means of a snug fit and/or by means of tack welding, on the seat defined by the outer periphery of the annular flange 15b and an associated annular step in the outer area of the end face 25 of the nozzle body 2. A downstream circumferential flange 18a of the funnel member 18 is provided for centering the nozzle tip of the injection moulding nozzle in a gate-side recess around the gate in the moulding cavity plate of an injection moulding system (not shown in the present connection).

Downstream of the point where they open into the annular recess 27, the connection holes 26 have a conically tapering configuration. The diameter and/or the structural design of the inner circumferential surface of the opening 16 of the second melt passage 6 in the tip insert 15 and/or the diameter and/or the structural design of the outer circumferential surface of the valve pin 8 (at least of part of said circumferential surface) reliably provide towards the valve pin 8 gap conditions between the opening 16 and said valve pin 8, which permit the plastic melt present below the valve pin 8 and in a gate—which is not shown in the present connection—in the open condition of said valve pin 8 to flow back between the opening 16 and the valve pin 8 into the melt passage 6 so as to permit closure of the gate. The flowback flow resistance which this plastic melt has to overcome in counterflow to the forward movement of the valve needle determines to an essential extent the time control characteristic of the valve pin 8. If desired, said valve pin 8 and/or the opening 16 can be provided with circumferentially spaced longitudinal recesses for the purpose of providing space so that the melt can flow back from the area of the gate.

In accordance with a preferred use of the injection moulding nozzle according to the present embodiment, said injection moulding nozzle is used for coinjection moulding including sequential moulding of a packaging element consisting of polypropylene and including a polyamide layer (nylon) as a core material in a sandwiched arrangement. It follows that, when the injection moulding nozzle 1 is used in a multi-cavity injection moulding system, the melt bores 7a, 7b have supplied thereto the polypropylene melt (PP), which enters the annular space 28, whereas the PA melt flows—controlled by the valve pin 8—through the central, second melt passage 6.

The injection moulding nozzle 1, in particular the nozzle body 2 with its rear end section 2a, its front end section 2b and its central section 2c extending between these sections 2a, 2b, is heated by an electrically insulated heating element 9, which comprises a rear section 9a, a central section 9b and a front section 9c, an exit end 9d, of the heating element 9, which is connected to the rear section 9a, being received in a connection fitting of an electric connection terminal 10. The heating element 9 has in the interior thereof a chrome/nickel resistance wire, which extends centrally through an electric insulating material consisting of a refractory powder material, such as magnesium oxide, said resistance wire and said refractory insulating powder being received in a steel jacket in the conventional manner.

As will be explained hereinbelow, the heating element 9, which is located in a heating element passage 11 extending axially along the outer surface 12 of the nozzle body 2, is, within said heating element passage 11, coated with a protective coating of nickel and is integrally brazed to the nozzle body 2 in a vacuum process so that the heating element 9 in said heating element passage 11 forms an integral unit with the nozzle body 2.

In particular the coinjection moulding of several plastic materials, which have different properties, through a single injection moulding nozzle necessitates precise temperature control of the heat profile along the melt passages 6, 7 within the injection moulding nozzle while taking into account the critical melt temperatures of the plastic materials on the one hand and tthe varying heat dissipation conditions between the injection moulding nozzle 1 and a tool body, which surrounds said injection moulding nozzle, on the other. For example, a particularly high heat dissipation can, on one hand, be observed in a rear end portion of the injection moulding nozzle, where said nozzle is closely surrounded by the cooled moulding cavity plate, and, on the other hand, also the nozzle tip, which is located in the gate area of the neighbouring moulding cavity plate, is subjected to increased heat dissipation, an adequate supply of heat being particularly important in this area in connection with e.g. thermal valve gating or valve pin gating. This is all the more true in cases in which the sequential injection moulding of two different plastic materials, which takes place within one injection moulding cycle, necessitates that—while avoiding as far as possible premature mixing of the plastic melts upstream of the gate—sequential opening and closure control of a melt passage opening (in this case the opening 16 of the central melt passage 6) is guaranteed while guaranteeing at the same time a temperature-stabilized injection-moulding capability of the other plastic melt (in this case of the first plastic melt contained in the annular space 28).

In order to achieve a high watt density and heating capacity in the area of the rear end section 2a of the nozzle body 2, the heating element passage 11 for the rear section 9a of the heating element 9 is, in this area, constructed such that a circumferential annular groove 13 is defined, which extends axially along the outer surface 12 of the nozzle body 2 and the groove base of which is reduced in diameter in comparison with the outer surface 12 of the nozzle body 2 (the difference in diameter with regard to the outer diameter of the nozzle body 2 corresponds essentially to twice the diameter of the heating element 9), said circumferential annular groove 13 permitting in a particularly simple manner winding of the heating element 9 in a plurality of axially successive, juxtaposed windings (after the fashion of a layer winding). Such a circumferential annular groove 13 can be produced in a particularly advantageous manner by subjecting the outer surface 12 of the nozzle body 2 to a turning process, the axial length of said groove 13 depending in particular on the size of the reception space which is to be provided for the heating element windings for the desired heat profile along the associated section of the melt passages 6, 7 as well as on the diameter of the heating element 9.

As can be seen from FIG. 1, the measure of constructing, in the central section 2c of the nozzle body 2 along the outer surface of said nozzle body, the heating element passage 11 in the conventional manner as a spiral passage whose dimensions correspond essentially to the cross-section of the heating element 9, the central section 9b of which is received in said spiral passage, will—because of the reduced heat dissipation taking place at this location—normally suffice to guarantee a sufficient and uniform heat profile along the central, second melt passage 6 as well as along the first and second melt bores 7a, 7b of the first melt passage 7. As shown in FIG. 1, the spiral passage may have a uniform spacing throughout the axial extension of the melt passages 6, 7a, 7b; however, a variable pitch of individual sections of the spiral passage is possible as well.

In order to achieve particularly advantageous results upon injection moulding of the first and second plastic melts with reliable temperature control of the first plastic melt contained in the annular space 28 and in order to provide the second melt in an injection-moulding permitting consistency in the area of the opening 16 of the second melt passage 6, which carries the second plastic melt (nylon), said opening being defined by the tip insert 15, a tip end 9f of the heating element 9 having two windings is provided directly in the area of the opening 16 of the second melt passage 6 along the conical outer surface section of the front end 15a of the tip insert 15 facing the side of the gate (cf. FIG. 3). The tip end 9f of the heating element 9 is connected to the front end 9c of the heating element 9 via an angled section 17 of the heating element passage 11, also said front end 9c being essentially accommodated in an axially extending circumferential annular groove 14, which is provided along the outer surface 12 of the nozzle body 2, in the form of closely spaced, successive juxtaposed windings so as to guarantee an increased heating capacity in this area as well.

It follows that, in the case of the present embodiment, the rear section 9a as well as the front section 9c of the heating element 9 are received in axially extending circumferential annular grooves 13 and 14, respectively, which receive therein a plurality of juxtaposed windings of the heating element 9. Alternatively, however, it would also be possible to provide a heating element passage 11, which is constructed as a circumferential annular groove arranged for receiving therein a plurality of juxtaposed heating element windings, either only in the area of the rear end section 2a or of the front end section 2b or in the conical end portion of the tip insert 15, whereas the remaining part of the heating element passage 11 defines a "single-start" spiral passage.

For electrically connecting the heating element 9 to a power supply source, the exit end 9d of the heating element 9, which is connected to the rear section 9a, extends radially outwards through a vertical slot 19 provided in the sleeve member 3, an electric connection fitting of the connection terminal 10 being inserted into a conical reception hole 34 of the sleeve member 3 after the fashion of a plug. For closing the rear end face 23 in the area of the vertical slot 19, a wedge member 20 can be inserted into the sleeve member 3 from the end face 23 of said sleeve member. If desired, the vertical slot 19 and the wedge member 20 can also be dispensed with, and the sleeve member 3 can be provided with a section, which is arranged in the interior of said sleeve member and which, when the sleeve member 3 is being attached to the nozzle body 2, takes hold of and radially deflects the exit and 9d of the heating element 9 through the conical reception hole 34.

A thermocouple 21, which is inserted into an elongate, eroded axial recess of th nozzle body 9, serves as a signal generator for controlling the temperature of the heating element 9.

An advantageous, hydrodynamically favourable structural design of the conical end section of the tip insert 15 with the two windings of the tip end 9d of the heating element 9 preferably accommodated on the outer periphery of said tip insert as well as a reliable protection of these windings against the first plastic melt, which is contained in the adjacent annular space 28, are achieved especially on the basis of the feature that a conical sleeve 29, which defines the conical outer end surface of the tip insert 15, is bonded to said tip insert.

With respect to the arrangement of the heating element 9, the present invention is not limited to such a nozzle designed to feed a plurality of differrent melts, but can easily be used for all types of injection moulding nozzles equipped with a spiral heating element, which extends along the outer surface of the injection moulding nozzle and which is used for heating the melt passage extending through the nozzle - no matter what the rest of the configuration of the injection moulding nozzle is like.

The design of the nozzle at the rear end theeof assures a smooth reception of the different materials from an associated melt distribution means, preferably a hot runner manifold system and facilitates fixing the nozzles thereto.

The nozzle tip is preferably provided with a tip insert and with a funnel member surrounding said tip insert, said funnel member being arranged such that it surrounds the tip insert and defines an annular space therewith. In cases in which the nozzle is arranged such that it is located at an axial distance from a gate in a moulding cavity plate, the funnel member projects beyond the tip insert in the axial direction.

In connection with the formation of the nozzle tip of the injection moulding nozzle as a separate insert member and a prefered use of valve gating of the nozzle tip, said tip insert preferably comprises a cylindrical core section and a radially extending annular flange, which is formed on said cylindrical core section on the side facing the nozzle body, said cylindrical core section and said annular flange being formed integrally with each other, whereas the downstream front end of said central core section of the tip insert, which is adapted to be brought into sealing engagement with the valve needle depending on the position of said valve needle, is provided with an end portion whose external geometry is partially conical.

In accordance with an additional advantageous embodiment of the subject matter of the invention, which can be applied depending on the materials used and depending on the other injection moulding conditions, it is thus provided that a conical end section of the tip insert is equipped with a circumferential recess, which is constructed as a front section of the heating element passage for receiving therein the tip end of the heating element.

In connection with an additionally preferred structural design of then nozzle tip including a tip insert of such a nature that the first and second melt bores of the first melt pasage open into the annular flange of said tip insert and that said annular flange includes in this area an annular recess on the downstream underside thereof, the feature that the tip end of the heating element is embedded at the front end section of the tip insert permits temperature control, which is effected almost directly at the gate, and heating of the second plastic melt in the central second melt passage, which is preferably controlled by the valve needle, as well as of the first plastic melt within an annular space extending along the outer circumference of the end section of the tip insert so that a highly sensitive and precise temperature control can be effected in the gate area of the injection moulding system.

Depending on the space available as well as on the necessary heating capacity at the outermost end of the injection moulding nozzle, the circumferential recess provided in the end section can be an annular passage or a spiral passage, a circumferential annular groove or, most preferably, a partially conically undercut section for receiving therein one or two windings of the heating element or for using two juxtaposed windings of the heating element, which are accommodated in succession and such that they directly abut on each other.

An advantageous and hydrodynamically favourable structural design of the conical end section of the tip insert including the two windings of the tip end of the heating element, which are preferably accommodated on the outer circumference thereof, and reliable protection of these windings against the first plastic melt contained in the adjacent annular space are achieved especially on the basis of the feature that a conical sleeve, which defines the conical outer surface at the end of the tip insert, is bonded to said tip insert.

In connection with the preferred structural design of the nozzle tip including a heated tip insert, a funnel member, which coaxially surrounds the tip insert, is preferably provided for creating smooth flow conditions and for forming the annular space, which surrounds the mouth of the central, second melt passage and to which the first melt passage is connected through two melt bores opening into said annular space at an upstream location, said funnel member being received in a circumferential seat defined by the circumference of the annular flange of the tip member as well as by an annular step provided in the front circumferential area of the nozzle body on an end face thereof.

Also the funnel member is adapted to be connected to the nozzle body in a snug fit such that a structural unit is formed; this connection can be effected as a positive connection and/or by means of bonding.

For achieving optimum heating of the melt passages as well as optimum temperature control along said melt passage within the injection moulding nozzle, an additional preferred embodiment of the present invention provides the feature that the heating element passage receiving therein the heating element is a spiral passage including, however, at least one section in which the heating element passage is formed such that it defines a circumferential annular groove, which extends axially along the outer surface of the nozzle body and which is adapted to receive therein a plurality of axially successive windings of the heating element, whereby a high watt density can be achieved in this area.

Such a circumferential annular groove, which is used for receiving therein the electric heating element with high packing density, is preferably provided at least in the area where heat disspation by the injection moulding system is particularly high, especially in the rear end section of the nozzle body. However, in accordance with the preferred embodiment of the present invention, also the front end secton of the nozzle body includes a heating element passage, which is constructed such that it defines the above-mentioned circumferential annular groove receiving therein a plurality of juxtaposed, successive windings of the heating element, and both annular grooves are interconnected by a spiral passage used for receiving therein the spirally shaped heating element.

A particularly simple structural design of the injection moulding nozzle and a particularly simple mode of heating said nozzle are achieved on the basis of the feature that one integral heating element is used for heating the whole injection moulding nozzle including the tip insert, which defines the nozzle tip, a radial connection passage, which is used for establishing a connection with the tip end of the heating element in the end section of the tip insert, being provided in the plane of division between said tip insert and the front end face of the nozzle body, said connection passage connecting the circumferential recess of the tip member to the front circumferential annular groove, which is used for receiving therein the front section of the electric heating element.

For fastening the injection moulding nozzle and for achieving the best possible heat insulation of said nozzle with respect to the surrounding moulding cavity plate, a sleeve member including an insulating flange is provided, which is adapted to be attached to the rear end section of the nozzle body such that a snug fit is obtained and which also serves to support a connection fitting of an electric connection terminal for radially guiding the heating element out of the device and for connecting it to an electric energy supply source.

The sensor used for monitoring and controlling the temperature profile along the injection moulding nozzle so as to control the supply of energy to the heating element is, preferably, a thermocouple, which is inserted into an axial recess provided in the nozzle body and which extends up to a point close to the front end face of said nozzle body.

The embodiments of the invention in which an exclusive property or privilege is claimed are defined as follows:

1. In an injection molding heated nozzle having an elongated body with a rear end face and a substantially cylindrical outer surface, the nozzle having first and second separate longitudinally extending melt passages, the second melt passage being a central melt bore extending coaxially through the nozzle body, the improvement wherein;

the first melt passage comprises first and second outer parallel melt bores extending through the nozzle body from the rear end face on opposite sides of the first melt passage, the rear end face of the nozzle body having an off center melt inlet recess and two melt branch passages, each branch passage extending from the inlet recess to one of the first and second outer melt bores.

2. An injection molding nozzle as claimed in claim 1 wherein the two branch passages extend circumferentially in opposite direction from the inlet recess in the rear end face of the nozzle body.

3. An injection molding nozzle as claimed in claim 2 wherein the inlet recess defines a semi-spherical cup recess and the branch passages define a semitoroidal cup recess in the rear end face of the nozzle body.

4. An injection molding nozzle as claimed in claim 3 wherein said second melt passage has a mouth which opens centrally into a nozzle tip and the two melt bores of the first melt passage open into an annular space which surrounds the mouth of the second melt passage in the nozzle tip.

5. An injection molding nozzle as claimed in claim 4 wherein the nozzle tip has a separate tip insert which is adapted to be connected to the nozzle body to form an integral structural unit therewith.

6. An injection molding nozzle as claimed in claim 5 wherein the nozzle tip has a funnel member surrounding the tip insert, whereby an annular space is formed around the tip insert.

7. An injection molding nozzle as claimed in claim 6 wherein the tip insert has a generally cylindrical core section and an integral annular flange, said cylindrical core section having a downstream front end with, at least partially, a conical configuration.

8. An injection molding nozzle as claimed in claim 7 wherein the front end of the core section of the tip insert has a circumferential recess for receiving therein a tip end of an electrical heating element.

9. An injection molding nozzle as claimed in claim 8 wherein the circumferential recess is a circumferential annular groove which is adapted to receive therein the tip end of the heating element in the form of a plurality of successive, juxtaposed windings.

10. An injection molding nozzle as claimed in claim 7 wherein the annular flange has a downstream lower side with an annular recess, and the first and second melt bores of the first melt passage open into said annular recess.

* * * * *